(12) United States Patent
Itadani et al.

(10) Patent No.: US 10,274,086 B2
(45) Date of Patent: Apr. 30, 2019

(54) SLIDING COMPONENT

(71) Applicant: EAGLE INDUSTRY CO., LTD., Minato-ku, Tokyo (JP)

(72) Inventors: Masatoshi Itadani, Tokyo (JP); Kazumasa Sunagawa, Tokyo (JP); Yuichiro Tokunaga, Tokyo (JP); Hideyuki Inoue, Tokyo (JP); Takeshi Hosoe, Tokyo (JP); Ryoma Yamakawa, Tokyo (JP); Yuta Negishi, Tokyo (JP); Kenji Kiryu, Tokyo (JP); Keiichi Chiba, Tokyo (JP); Akira Yoshino, Tokyo (JP); Hiroshi Kubota, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 87 days.

(21) Appl. No.: 15/505,562

(22) PCT Filed: Aug. 26, 2015

(86) PCT No.: PCT/JP2015/073945
§ 371 (c)(1),
(2) Date: Feb. 21, 2017

(87) PCT Pub. No.: WO2016/042989
PCT Pub. Date: Mar. 24, 2016

(65) Prior Publication Data
US 2017/0268679 A1 Sep. 21, 2017

(30) Foreign Application Priority Data

Sep. 20, 2014 (JP) .................. 2014-192046

(51) Int. Cl.
*F16J 15/34* (2006.01)
*F16J 15/06* (2006.01)

(52) U.S. Cl.
CPC ....... *F16J 15/3404* (2013.01); *F16J 15/3412* (2013.01); *F16J 15/3488* (2013.01); *F16J 15/062* (2013.01)

(58) Field of Classification Search
CPC ...... F16J 15/34; F16J 15/3404; F16J 15/3408; F16J 15/3412; F16J 15/3416; F16J 15/3424
(Continued)

(56) References Cited

U.S. PATENT DOCUMENTS 3,147,013 A * 9/1964 Tracy .................... F04D 29/126
277/400
3,672,689 A * 6/1972 Hadley .................... F16J 15/38
277/373
(Continued)

FOREIGN PATENT DOCUMENTS

CN 103765060 A 4/2014
CN 103791097 A 5/2014
(Continued)

OTHER PUBLICATIONS

A First Office Action issued by the State Intellectual Property Office of China dated Sep. 4, 2017 for Chinese counterpart application No. 201580036202.4.
(Continued)

*Primary Examiner* — Kristina R Fulton
*Assistant Examiner* — L. Susmitha Koneru
(74) *Attorney, Agent, or Firm* — Law Office of Katsuhiro Arai

(57) ABSTRACT

Provided is a slide component that can prevent deposit formation on a sealing face as well as promoting circulation of a fluid on sealing faces while fulfilling both conflicting conditions of sealing and lubrication, to maintain the sealing function of the sealing faces for a long period of time. The
(Continued)

slide component includes a pair of slide parts that relatively slide on each other, one of the slide parts being provided in a sealing face with fluid circulation grooves 10 that communicate with a high-pressure fluid side via an inlet portion and an outlet portion and are separated from a low-pressure fluid side by a land portion, the other of the slide parts being provided in a sealing face with interference grooves 15 that communicate with the high-pressure fluid side and produce pressure variations in a fluid in the fluid circulation grooves 10.

6 Claims, 6 Drawing Sheets

(58) Field of Classification Search
USPC .................................................. 277/399, 400
See application file for complete search history.

(56) References Cited

U.S. PATENT DOCUMENTS

| | | | | |
|---|---|---|---|---|
| 3,746,350 | A * | 7/1973 | Mayer | F16J 15/3404 277/366 |
| 4,155,561 | A * | 5/1979 | Rudy | F16L 23/18 277/641 |
| 4,416,458 | A * | 11/1983 | Takenaka | F16J 15/3412 277/399 |
| 5,246,295 | A * | 9/1993 | Ide | F16J 15/3432 384/124 |
| 5,498,007 | A | 3/1996 | Kulkarni et al. | |
| 5,556,111 | A * | 9/1996 | Sedy | F16J 15/3412 277/400 |
| 6,446,976 | B1 * | 9/2002 | Key | F16J 15/3416 277/367 |
| 6,575,470 | B1 * | 6/2003 | Gacek | F16J 15/3412 277/399 |
| 7,258,346 | B2 * | 8/2007 | Tejima | F16J 15/3412 277/399 |
| 2012/0217705 | A1 * | 8/2012 | Hosoe | F16J 15/3412 277/400 |
| 2014/0197600 | A1 | 7/2014 | Hosoe et al. | |

FOREIGN PATENT DOCUMENTS

| | | |
|---|---|---|
| JP | S59110959 A | 6/1984 |
| JP | 1985167861 U1 | 11/1985 |
| JP | H7180772 A | 7/1995 |
| JP | H7224948 A | 8/1995 |

OTHER PUBLICATIONS

International Search Report (ISR) dated Oct. 6, 2015, issued for International application No. PCT/JP2015/073945.

* cited by examiner

SLIDING COMPONENT

This application is the U.S. National Phase under 35 U.S.C. § 371 of International Application PCT/JP2015/073945, filed Aug. 26, 2015, which claims priority to Japanese Patent Application No. 2014-192046, filed Sep. 20, 2014. The International Application was published under PCT Article 21(2) in a language other than English.

TECHNICAL FIELD

The present invention relates to slide components suitable for, for example, mechanical seals, bearings, and other slide portions, and in particular, relates to slide components such as seal rings or bearings that require friction reduction by interposing a fluid between sealing faces as well as prevention of fluid leakage from the sealing faces.

BACKGROUND ART

A mechanical seal, an example of a slide component, is evaluated for its performance by a leakage rate, a wear rate, and torque. In conventional arts, by optimizing the seal material and the sealing face roughness of a mechanical seal, performance is increased, and low leakage, long life, and low torque are achieved. However, due to growing awareness of environmental problems in recent years, a further improvement in the performance of mechanical seals has been demanded, for which technology development beyond the limits of the conventional arts has been required.

In that context, the inventors have confirmed that in a mechanical seal in a water pump used for cooling a water-cooled engine, for example, an additive in LLC, a type of antifreeze, such as silicate or phosphate (hereinafter, referred to as a "deposit formation-causing substance") can be concentrated on a sealing face, forming a deposit as time passes, and degrading the function of the mechanical seal. The deposit formation is considered as a phenomenon that occurs likewise in mechanical seals in apparatuses that handle chemicals or oils.

There is a known conventional mechanical seal in which a sealing face is formed with grooves to form a fluid layer in order to prevent occurrence of wear or burn damage of sealing faces due to frictional heat generation (see Patent Documents 1, 2, and 3, for example). However, these inventions only introduce a fluid into a sealing face, and do not take measures to prevent formation of deposits on a sealing face.

CITATION LIST

Patent Document

Patent Document 1: JP H7-180772 A
Patent Document 2: JP H7-224948 A
Patent Document 3: U.S. Pat. No. 5,498,007

SUMMARY OF THE INVENTION

Problem to be Solved by the Invention

The present invention has an object of providing a slide component that can prevent deposit formation on a sealing face as well as promoting circulation of a fluid on sealing faces while fulfilling both conflicting conditions of sealing and lubrication, to maintain the sealing function of the sealing faces for a long period of time.

Means for Solving Problem

To attain the above object, a slide component according to a first aspect of the present invention includes a pair of slide parts that relatively slide on each other, one of the slide parts being provided in a sealing face with a fluid circulation groove that communicates with a high-pressure fluid side via an inlet portion and an outlet portion and is separated from a low-pressure fluid side by a land portion, the other of the slide parts being provided in a sealing face with at least one interference groove that communicates with the high-pressure fluid side, the at least one interference groove producing pressure variations in a fluid in the fluid circulation groove.

According to this aspect, there is a pressure difference between the inlet portion and the outlet portion of the fluid circulation groove, which is constantly varying alternately, and the fluid in the fluid circulation groove repeats movements. Thus, even when a sealed fluid contains a deposit formation-causing substance, formation of deposits in the fluid circulation groove can be prevented, and the sealing function of the sealing faces can be maintained for a long period of time.

According to a second aspect of the present invention, in the slide component according to the first aspect, the at least one interference groove comprises a plurality of interference grooves provided circumferentially, and the plurality of interference grooves is arranged so that when one of the interference grooves is in a position facing the inlet portion of the fluid circulation groove, the other interference groove or grooves are not in a position facing the outlet portion of the fluid circulation groove.

According to this aspect, the pressure difference between the inlet portion and the outlet portion of the fluid circulation groove can be increased and produced reliably, and formation of deposits in the fluid circulation groove can be further prevented.

According to a third aspect of the present invention, in the slide component according to the first or second aspect, the one slide part is a stationary-side seal ring, the other slide part is a rotating-side seal ring, the rotating-side seal ring is formed larger in outside diameter and smaller in inside diameter than the stationary-side seal ring, and the at least one interference groove is provided in a position to produce pressure variations in the fluid in the inlet portion and the outlet portion of the fluid circulation groove.

According to this aspect, since a sealing face width depends on the stationary-side seal ring, variation in the sealing face width can be reduced. Further, since the at least one interference groove is formed in the sealing face of the rotating-side seal ring, a swirl flow accompanied by a vortex is actively formed, and the pressure difference between the inlet portion and the outlet portion of the fluid circulation groove can be further increased.

According to a fourth aspect of the present invention, in the slide component according to any one of the first to third aspects, an end of the at least one interference groove on an inside-diameter side extends to a position radially in proximity to the inlet portion and the outlet portion of the fluid circulation groove.

According to this aspect, the pressure difference between the inlet portion and the outlet portion of the fluid circulation groove can be further increased.

According to a fifth aspect of the present invention, in the slide component according to any one of the first to third aspects, an end of the at least one interference groove on an inside-diameter side extends to a position radially overlapping the inlet portion and the outlet portion of the fluid circulation groove.

According to this aspect, a pressure-varying effect by the at least one interference groove is exerted directly on the inlet portion and the outlet portion of the fluid circulation groove, and thus the pressure difference between the inlet portion and the outlet portion of the fluid circulation groove can be even further increased.

Effect of the Invention

The present invention achieves the following outstanding effects.

(1) The fluid circulation groove communicating with the high-pressure fluid side via the inlet portion and the outlet portion and separated from the low-pressure fluid side by the land portion is provided in the sealing face of the one slide part, and the at least one interference groove communicating with the high-pressure fluid side, for producing pressure variations in the fluid in the fluid circulation groove is provided in the sealing face of the other slide part, whereby there is a pressure difference between the inlet portion and the outlet portion of the fluid circulation groove, which is varying alternately, and the fluid in the fluid circulation groove repeats movements. Thus, even when a sealed fluid contains a deposit formation-causing substance, formation of deposits in the fluid circulation groove can be prevented, and the sealing function of the sealing faces can be maintained for a long period of time.

(2) The at least one interference groove includes a plurality of interference grooves that is provided circumferentially and is arranged so that when one of the interference grooves is in a position facing the inlet portion of the fluid circulation groove, the other interference groove or grooves are not in a position facing the outlet portion of the fluid circulation groove. Thus the pressure difference between the inlet portion and the outlet portion of the fluid circulation groove can be increased and produced reliably, and formation of deposits in the fluid circulation groove can be further prevented.

(3) The fluid circulation groove is formed in the stationary-side seal ring, the at least one interference groove is formed in the rotating-side seal ring, the rotating-side seal ring is formed larger in outside diameter and smaller in inside diameter than the stationary-side seal ring, and the at least one interference groove is provided in a position to produce pressure variations in the fluid in the inlet portion and the outlet portion of the fluid circulation groove, whereby the sealing face width depends on the stationary-side seal ring, and thus variation in the sealing face width can be reduced. Further, since the at least one interference groove is formed in the sealing face of the rotating-side seal ring, a swirl flow accompanied by a vortex is actively formed, and the pressure difference between the inlet portion and the outlet portion of the fluid circulation groove can be further increased.

(4) The end of the at least one interference groove on the inside-diameter side extends to a position radially in proximity to the inlet portion and the outlet portion of the fluid circulation groove, whereby the pressure difference between the inlet portion and the outlet portion of the fluid circulation groove can be further increased.

(5) The end of the at least one interference groove on the inside-diameter side extends to a position radially overlapping the inlet portion and the outlet portion of the fluid circulation groove, whereby a pressure-varying effect by the at least one interference groove is exerted directly on the inlet portion and the outlet portion of the fluid circulation groove, and thus the pressure difference between the inlet portion and the outlet portion of the fluid circulation groove can be even further increased.

DESCRIPTION OF EMBODIMENTS

Hereinafter, with reference to the drawings, embodiments for implementing the present invention will be described illustratively based on implementation examples. However, the sizes, materials, shapes, relative arrangements, and others of components described in the embodiments are not intended to limit the scope of the present invention only to them unless otherwise described explicitly.

First Embodiment

Figure 1:
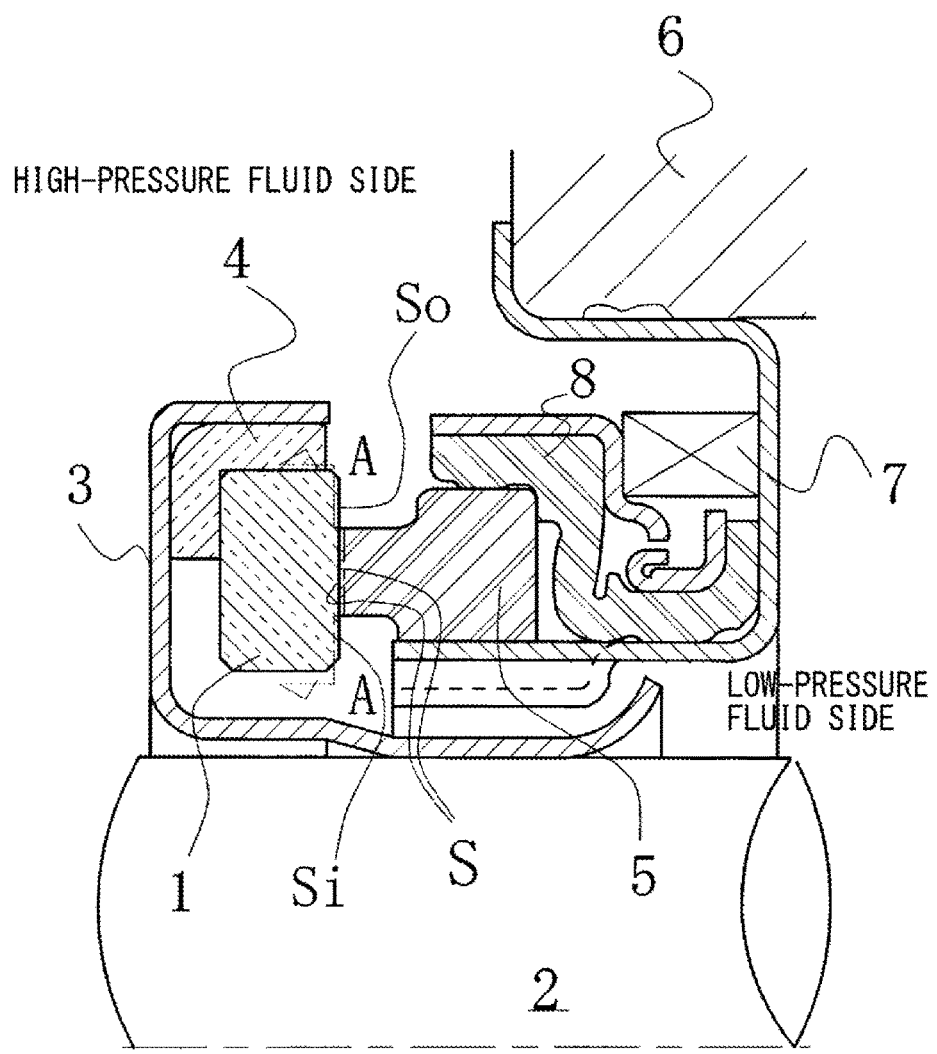
FIG. 1 is a vertical cross-sectional view showing an example of a mechanical seal according to a first embodiment of the present invention, showing an upper half thereof from the center of a rotating shaft.
Figure 2:
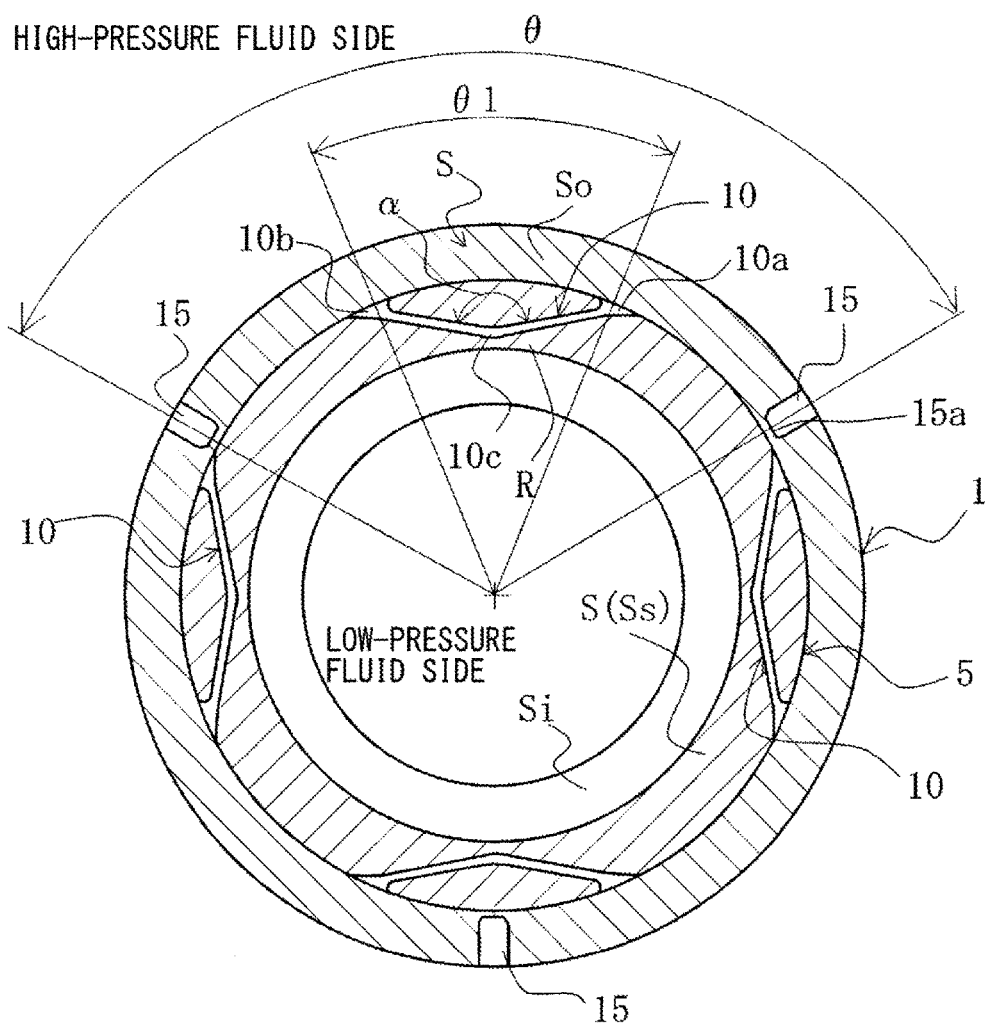
FIG. 2 is a cross-sectional view of sealing faces of slide parts taken along A-A in FIG. 1, cut at portions in proximity to the sealing faces for explaining the characteristics of the sealing faces, and showing the circumferences of the sealing faces.
Figure 3:
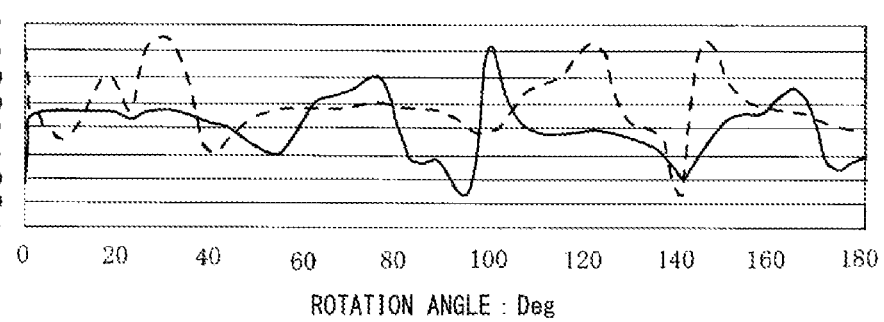
FIG. 3 shows mean pressures in an inlet portion and at an outlet portion of a fluid circulation groove provided in a stationary-side seal ring when a rotating-side seal ring is rotated.

With reference to FIGS. 1 to 3, a slide component according to a first embodiment of the present invention will be described.

In the following embodiment, a mechanical seal, an example of the slide component, will be described as an example. The outer-peripheral side of slide parts constituting the mechanical seal is described as the high-pressure fluid side (sealed fluid side), and the inner-peripheral side as the low-pressure fluid side (atmosphere side). However, the present invention is not limited to this, and is applicable to a case where the high-pressure fluid side and the low-pressure fluid side are reversed.

FIG. 1 is a vertical cross-sectional view showing an example of the mechanical seal, which is an inside mechanical seal in a form of sealing a sealed fluid on the high-pressure fluid side trying to leak from the outer periphery of sealing faces toward the inner periphery. The mechanical seal is provided, on the side of a rotating shaft 2 to drive a rotor (e.g. a pump impeller not shown) on the high-pressure fluid side, with a rotating-side seal ring 1 in an annular shape, one of the slide parts, provided in a state of being rotatable with the rotating shaft 2 in an integrated manner via a sleeve 3 and a cup gasket 4, and at a housing 6, with a stationary-side seal ring 5 in an annular shape, the other of the slide parts, provided in a state of being non-rotatable and axially movable. By a coiled wave spring 7 and a bellows 8 axially biasing the stationary-side seal ring 5, the rotating-side seal ring 1 and the stationary-side seal ring 5 slide in close contact with each other on sealing portions S of sealing faces mirror-finished by lapping or the like. That is, the mechanical seal prevents the sealed fluid from flowing from the outer periphery of the rotating shaft 2 to the atmosphere side at the sealing portions S between the rotating-side seal ring 1 and the stationary-side seal ring 5.

In the mechanical seal, commonly, in order to accommodate a case where the rotation centers of the rotating-side seal ring 1 and the stationary-side seal ring 5 do not strictly agree, the sealing face width of one of them is made larger, that is, the outside diameter thereof is made larger and the inside diameter thereof is made smaller to form a sealing face margin So on the outside-diameter side and a sealing face margin Si on the inside-diameter side. In the present invention, portions on which the rotating-side seal ring 1 and the stationary-side seal ring 5 actually slide are referred to as sealing portions Ss, and a sealing face including sealing face margins is referred to as a sealing face S.

FIG. 1 shows a case where the outside diameter of the rotating-side seal ring 1 is larger than the outside diameter of the stationary-side seal ring 5, and the inside diameter of the rotating-side seal ring 1 is smaller than the inside diameter of the stationary-side seal ring 5, and the sealing face margins are formed on the rotating-side seal ring 1. The present invention is not limited to this, and is applicable to the opposite case as a matter of course.

In the case in FIG. 1, the sealing portion Ss and the sealing face S of the stationary-side seal ring 5 are the same.

FIG. 2 is a cross-sectional view along A-A in FIG. 1, in which the sealing faces S of the rotating-side seal ring 1 and the stationary-side seal ring 5 are shown by hatching.

In FIG. 2, it is assumed that the outside-diameter side of the sealing faces S is the high-pressure fluid side, and the inside-diameter side is the low-pressure fluid side, for example, the atmosphere side, and the rotating-side seal ring 1 rotates counterclockwise.

The sealing face S of the stationary-side seal ring 5 is provided circumferentially with four evenly spaced fluid circulation grooves 10 that communicate with the high-pressure fluid side and are separated from the low-pressure fluid side by smooth portions R of the sealing face (in the present invention, sometimes referred to as "land portions").

The fluid circulation grooves 10 are not limited in number to four. It is only necessary to provide at least one fluid circulation groove 10. The fluid circulation grooves 10 do not need to be evenly spaced.

The fluid circulation grooves 10 each include an inlet portion 10a for entry from the high-pressure fluid side, an outlet portion 10b for exit to the high-pressure fluid side, and a connection portion 10c circumferentially connecting the inlet portion 10a and the outlet portion 10b. The fluid circulation grooves 10 have the function of actively introducing the sealed fluid from the high-pressure fluid side into the sealing portion and discharging it in order to prevent concentration of a fluid containing a corrosion product or the like on the sealing portion Ss. The inlet portions 10a and the outlet portions 10b are formed with a wide mouth as shown in the drawing so as to facilitate taking the sealed fluid into the sealing portion and discharging it in accordance with the rotation of the opposite sealing face. On the other hand, the fluid circulation grooves 10 are separated from the low-pressure fluid side by the land portions R to reduce leakage.

In this example, the inlet portions 10a and the outlet portions 10b are formed in a linear shape and form a substantially V shape, which is not particularly limiting. The interior angle $\alpha$ between the inlet portions 10a and the outlet portions 10b may be further increased or decreased. The inlet portions 10a and the outlet portions 10b may be formed in a curved shape (such as an arc shape) instead of in a linear shape. The width and depth of the fluid circulation grooves 10 are set optimally according to the pressure, type (viscosity), and others of the sealed fluid. An example of the depth is about 100 to 300 μm.

The fluid circulation grooves are not limited to the substantially V shape, and may be in a U shape, for example. It is essential only that the inlet portions and the outlet portions communicate with the high-pressure fluid side.

The sealing face S of the rotating-side seal ring 1 is provided with interference grooves 15 for producing pressure variations in the fluid in the fluid circulation grooves 10.

The interference grooves 15 communicate with the high-pressure fluid side, and are arranged radially in positions to produce pressure variations in the fluid in the inlet portions 10a and the outlet portions 10b of the fluid circulation grooves 10.

In the case in FIG. 2, the interference grooves 15 are provided in the sealing face margin So on the outside-diameter side, and their ends 15a on the inside-diameter side extend radially to positions in proximity to the inlet portions 10a and the outlet portions 10b of the fluid circulation grooves 10.

The word "proximity" mentioned here means radial proximity to the extent that vortexes formed in the interference grooves 15 or the like produce pressure variations in the fluid in the inlet portions 10a and the outlet portions 10b of the fluid circulation grooves 10.

In FIG. 2, the fluid circulation grooves 10 are formed to the outer periphery of the sealing face S (identical with the sealing portion Ss) of the stationary-side seal ring 5, and thus the ends 15a of the interference grooves 15 on the inside-diameter side extend radially to the positions in proximity to the outer periphery of the sealing face S of the stationary-side seal ring 5.

The shape of the interference grooves 15, which are shown in a substantially rectangular shape in FIG. 2, is not limited to this, and may be, for example, a circle, an oval, a rhombus, or the like. It is essential only that the interference grooves 15 communicate with the high-pressure fluid side, and the ends 15a on the inside-diameter side extend to positions in proximity to the inlet portions 10a and the outlet portions 10b of the fluid circulation grooves 10.

The depth of the interference grooves 15 is not particularly limited and, for example, may be the same as the depth of the fluid circulation grooves 10, or may be set slightly deeper.

In FIG. 2, the three interference grooves 15 are evenly spaced circumferentially. The plurality of interference grooves 15 is arranged so that when one of the interference grooves 15 is in a position facing the inlet portion 10a of one of the fluid circulation grooves 10, the other interference grooves 15 are not in a position facing the outlet portion 10b of the fluid circulation groove 10. In the case in FIG. 2, the four fluid circulation grooves 10 are evenly spaced, and the central angle $\theta 1$ between the inlet portions 10a and the outlet portions 10b of the fluid circulation grooves 10 is about 45°, while the central angle $\theta$ between adjacent ones of the interference grooves 15 is 120°. Thus, when the rotating-side seal ring 1 rotates and one of the interference grooves 15 is in a position facing the inlet portion 10a of one of the fluid circulation grooves 10, the other interference grooves 15 are not in a position facing the outlet portion 10b of the fluid circulation groove 10.

The interference grooves 15 are not limited in number to three circumferentially. It is only necessary to provide at least one interference groove 15. The interference grooves 15 do not need to be evenly spaced.

When the rotating-side seal ring 1 is rotated, vortexes are formed in the vicinities of the interference grooves 15, and the interference grooves 15 accompanied by the vortexes move circumferentially.

Now, one of the interference grooves 15 reaches a position facing the inlet portion 10a of one of the fluid circulation grooves 10, the pressure of the fluid in the inlet portion 10a increases. At this time, since the other interference grooves 15 are set not to be in a position facing the outlet portion 10b, there is no increase in the pressure of the fluid in the outlet portion 10b, resulting in a state where pressure in the inlet portion 10a>pressure in the outlet portion 10b.

Then, when the interference groove 15 reaches the position facing the outlet portion 10b of the fluid circulation groove 10, the pressure of the fluid in the outlet portion 10b increases. At this time, since the other interference grooves 15 are set not to be in the position facing the inlet portion 10a, there is no increase in the pressure of the fluid in the inlet portion 10a, resulting in a state where pressure in the inlet portion 10a<pressure in the outlet portion 10b.

That is, when attention is paid to one of the fluid circulation grooves 10, by the effects of the interference grooves 15, there is a pressure difference between the inlet portion 10a and the outlet portion 10b, which is constantly varying alternately.

FIG. 3 shows mean pressures in the inlet portions 10a and the outlet portions 10b of the fluid circulation grooves 10 provided in the stationary-side seal ring 5 when the rotating-side seal ring 1 is rotated. A solid line represents the mean pressure in the inlet portions 10a, and a broken line represents the mean pressure in the outlet portions 10b. This graph shows that there is a pressure difference between the inlet portions 10a and the outlet portions 10b, and it is constantly varying alternately. In particular, it shows that at rotation angles of about 100° and 150°, the difference between the mean pressure in the inlet portions 10a and the mean pressure in the outlet portions 10b is increased.

When brought into a state where there is a pressure difference between the inlet portions 10a and the outlet portions 10b, and it is constantly varying alternately, the fluid in the fluid circulation grooves 10 repeats movements. Thus, even when the sealed fluid contains a deposit formation-causing substance, formation of deposits in the fluid circulation grooves 10 is prevented.

The first embodiment achieves the following prominent effects.

(1) The fluid circulation grooves 10 communicating with the high-pressure fluid side via the inlet portions 10a and the outlet portions 10b and separated from the low-pressure fluid side by the land portions R are provided in the sealing face of the stationary-side seal ring 5, and the interference grooves 15 for producing pressure variations in the fluid in the fluid circulation grooves 10 are provided in the sealing face of the rotating-side seal ring 1. Thus there is a pressure difference between the inlet portions 10a and the outlet portions 10b of the fluid circulation grooves 10, which is constantly varying alternately, and the fluid in the fluid circulation grooves 10 repeats movements. Thus, even when the sealed fluid contains a deposit formation-causing substance, formation of deposits in the fluid circulation grooves 10 can be prevented, and the sealing function of the sealing faces can be maintained for a long period of time. Further, since the sealing face width depends on the stationary-side seal ring 5, variation in the sealing face width can be reduced.

(2) The plurality of interference grooves 15 is provided circumferentially. The plurality of interference grooves 15 is arranged so that when one of the interference grooves 15 is in a position facing the inlet portion 10a of one of the fluid circulation grooves 10, the other interference grooves 15 are not in a position facing the outlet portion 10b of the fluid circulation groove 10. Thus the pressure difference between the inlet portions 10a and the outlet portions 10b of the fluid circulation grooves 10 can be increased and reliably produced, and formation of deposits in the fluid circulation grooves 10 can be further prevented.

(3) Since the ends 15a of the interference grooves 15 on the inside-diameter side extend to positions in proximity to the inlet portions 10a and the outlet portions 10b of the fluid circulation grooves 10, the pressure difference between the inlet portions 10a and the outlet portions 10b of the fluid circulation grooves 10 can be further increased.

Second Embodiment

Figure 4:
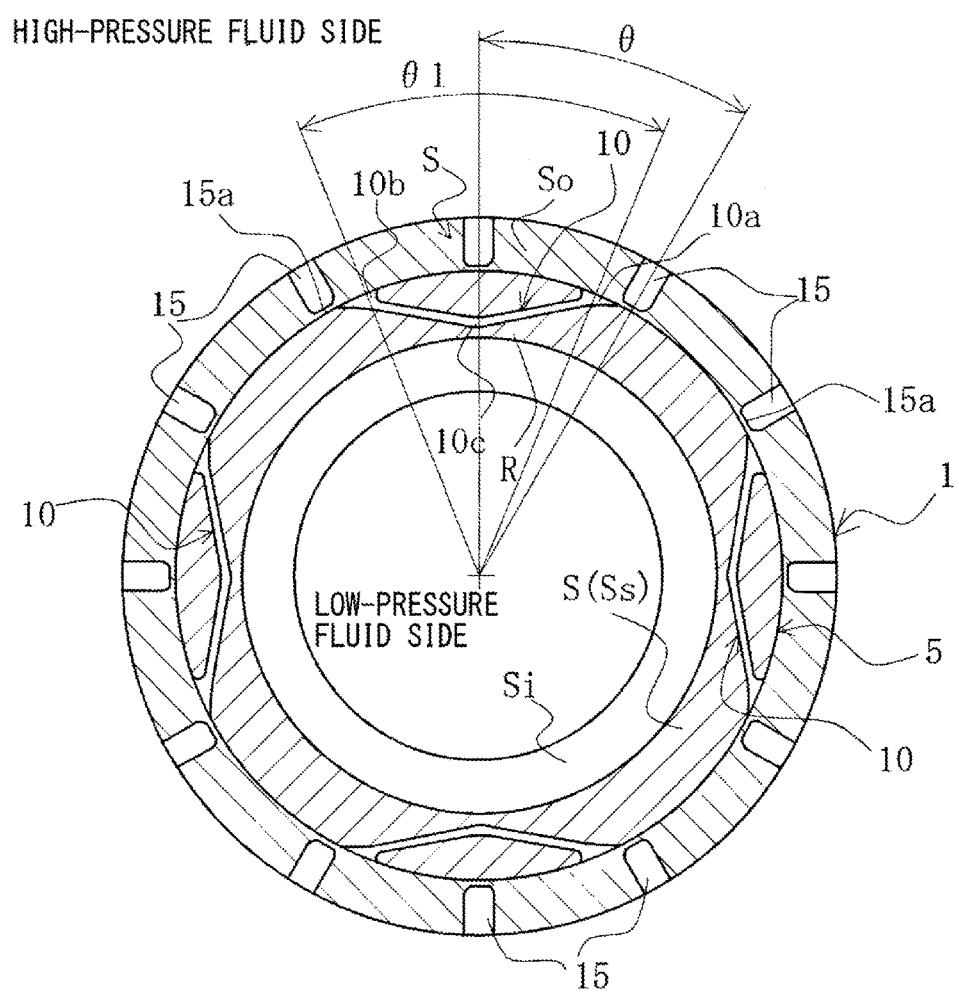
FIG. 4 shows sealing faces of slide parts according to a second embodiment of the present invention in the same manner as FIG. 2.

With reference to FIG. 4, a slide component according to a second embodiment of the present invention will be described.

The second embodiment is different from the first embodiment in that the number of interference grooves 15 is higher, but is identical with the first embodiment in that the plurality of interference grooves 15 is arranged so that when one of the interference grooves 15 is in a position facing an inlet portion 10a of a fluid circulation groove 10, the other interference grooves 15 are not in a position facing an outlet portion 10b of the fluid circulation groove 10.

In FIG. 4, the same reference numerals as in FIG. 2 denote the same members, and redundant descriptions will be omitted.

In FIG. 4, twelve interference grooves 15 are evenly spaced circumferentially. The plurality of interference grooves 15 is arranged so that when one of the interference grooves 15 is in a position facing an inlet portion 10a of a fluid circulation groove 10, the other interference grooves 15 are not in a position facing an outlet portion 10b of the fluid circulation groove 10. In the case in FIG. 4, four fluid circulation grooves 10 are evenly spaced. The central angle θ1 between the inlet portions 10a and the outlet portions 10b of the fluid circulation grooves 10 is about 45°, while the central angle θ between adjacent ones of the interference grooves 15 is 30°. Thus, when a rotating-side seal ring 1 rotates and one of the interference grooves 15 is in a position facing the inlet portion 10a of one of the fluid circulation grooves 10, the other interference grooves 15 are not in a position facing the outlet portion 10b of the fluid circulation groove 10.

The interference grooves 15 do not need to be evenly spaced circumferentially, and are not limited in number to twelve. It is essential only that when the rotating-side seal ring 1 rotates and one of the interference grooves 15 is in a position facing the inlet portion 10a of one of the fluid circulation grooves 10, the other interference grooves 15 are not in a position facing the outlet portion 10b of the fluid circulation groove 10.

In the second embodiment, since the multiple interference grooves 15 are provided circumferentially, the pressure difference between the inlet portions 10a and the outlet portions 10b of the fluid circulation grooves 10 can be more frequently varied alternately than in the case of the first embodiment, and formation of deposits in the fluid circulation grooves 10 can be further prevented.

Third Embodiment

Figure 5:
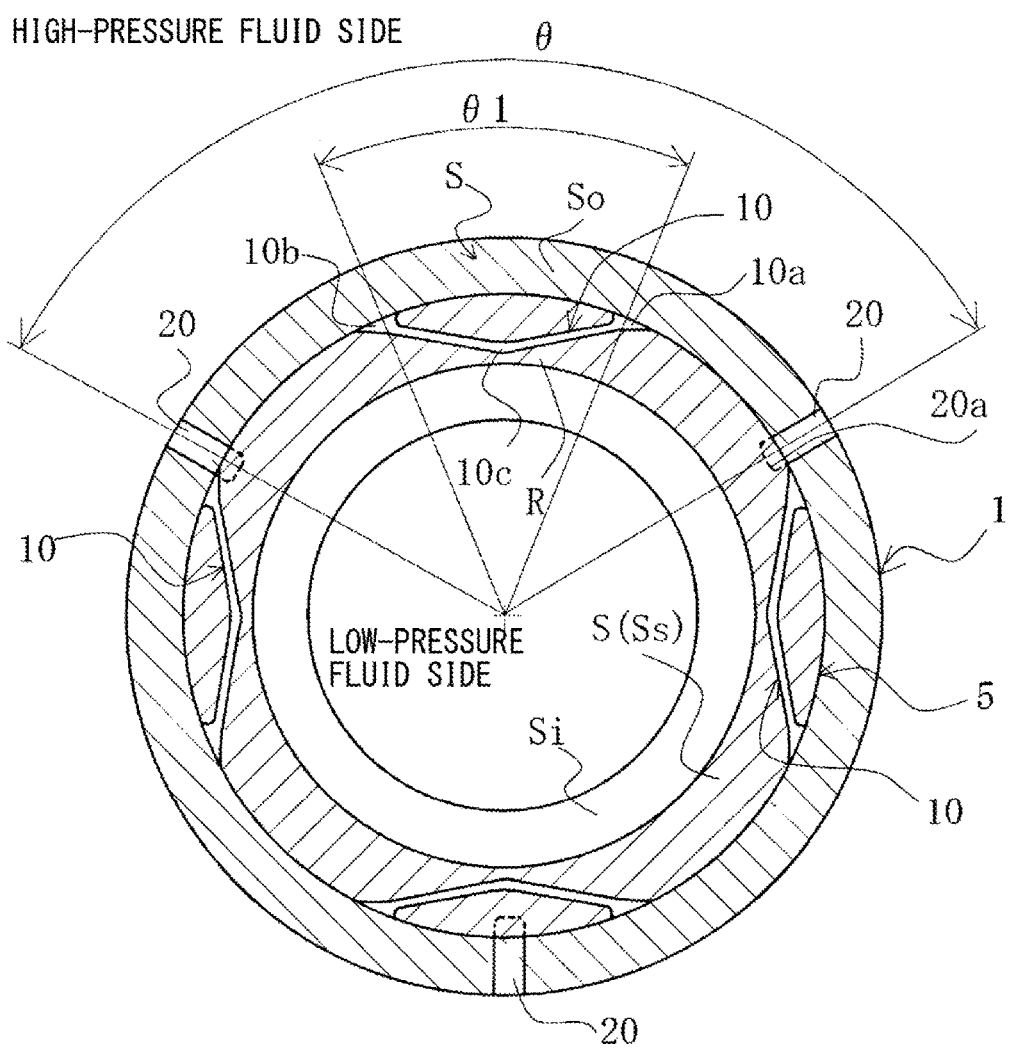
FIG. 5 shows sealing faces of slide parts according to a third embodiment of the present invention in the same manner as FIG. 2.

With reference to FIG. 5, a slide component according to a third embodiment of the present invention will be described.

The third embodiment is different from the first embodiment shown in FIG. 2 in that ends of interference grooves on the inside-diameter side extend into a sealing portion Ss of a rotating-side seal ring 1, but otherwise identical with the first embodiment.

In FIG. 5, the same reference numerals as in FIG. 2 denote the same members, and redundant descriptions will be omitted.

In FIG. 5, a sealing face S of the rotating-side seal ring 1 is provided with three interference grooves 20 evenly spaced circumferentially. The interference grooves 20 communicate with the high-pressure fluid side, and ends 20a of the interference grooves 20 on the inside-diameter side extend to positions radially overlapping inlet portions 10a and outlet portions 10b of fluid circulation grooves 10 as shown by broken lines. That is, the interference grooves 20 are formed to extend radially beyond a sealing face margin So on the outside-diameter side to the sealing portion Ss of the rotating-side seal ring 1.

When the rotating-side seal ring 1 is rotated, vortexes are formed in the vicinities of the interference grooves 20, and the interference grooves 20 accompanied by the vortexes move circumferentially. At that time, the interference grooves 20 pass over the inlet portions 10a and the outlet portions 10b of the fluid circulation grooves 10. Therefore, the effect of the interference grooves 20 on the inlet portions 10a and the outlet portions 10b of the fluid circulation grooves 10 is increased, and pressure variations in the inlet portions 10a and the outlet portions 10b are also increased.

Since the pressure difference between the inlet portions 10a and the outlet portions 10b is increased and constantly varies alternately, formation of deposits in the fluid circulation grooves 10 is further prevented.

In the third embodiment, the ends 20a of the interference grooves 20 on the inside-diameter side extend to the positions radially overlapping the inlet portions 10a and the outlet portions 10b of the fluid circulation grooves 10, whereby pressure-varying effects by the interference grooves 20 are exerted directly on the inlet portions 10a and the outlet portions 10b of the fluid circulation grooves 10, thus achieving a prominent effect that the pressure difference between the inlet portions 10a and the outlet portions 10b of the fluid circulation grooves 10 can be even further increased.

Fourth Embodiment

Figure 6:
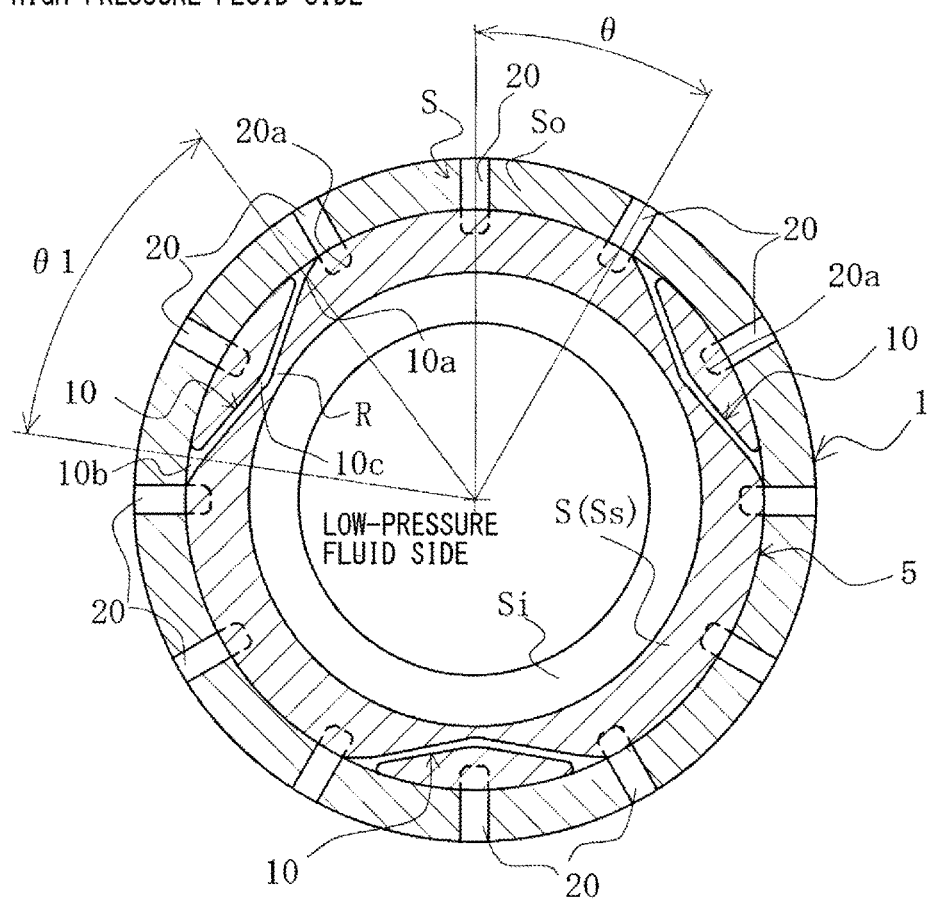
FIG. 6 shows sealing faces of slide parts according to a fourth embodiment of the present invention in the same manner as FIG. 2.

With reference to FIG. 6, a slide component according to a fourth embodiment of the present invention will be described.

The fourth embodiment is identical with the third embodiment shown in FIG. 5 in that ends of interference grooves on the inside-diameter side extend into a sealing portion Ss of a rotating-side seal ring 1. In FIG. 6, the same reference numerals as in FIG. 5 denote the same members, and redundant descriptions will be omitted.

In FIG. 6, twelve interference grooves 20 are evenly spaced circumferentially. The plurality of interference grooves 20 is arranged so that when one of the interference grooves 20 is in a position facing an inlet portion 10a of a fluid circulation groove 10, the other interference grooves 20 are not in a position facing an outlet portion 10b of the fluid circulation groove 10. In the case in FIG. 6, three fluid circulation grooves 10 are evenly spaced, and the central angle θ1 between the inlet portions 10a and the outlet portions 10b of the fluid circulation grooves 10 is about 45°, while the central angle θ between adjacent ones of the interference grooves 20 is 30°. Thus, when the rotating-side seal ring 1 rotates and one of the interference grooves 20 is in a position facing the inlet portion 10a of one of the fluid circulation grooves 10, the other interference grooves 20 are not in a position facing the outlet portion 10b of the fluid circulation groove 10.

The interference grooves 20 do not need to be evenly spaced circumferentially, and are not limited in number to twelve. It is essential only that when the rotating-side seal ring 1 rotates and one of the interference grooves 20 is in a position facing the inlet portion 10a of one of the fluid circulation grooves 10, the other interference grooves 20 are not in a position facing the outlet portion 10b of the fluid circulation groove 10.

The interference grooves 20 communicate with the high-pressure fluid side, and ends 20a of the interference grooves 20 on the inside-diameter side extend to positions radially overlapping the inlet portions 10a and the outlet portions 10b of the fluid circulation grooves 10 as shown by broken lines. That is, the interference grooves 20 are formed to extend radially beyond a sealing face margin So on the outside-diameter side to a sealing portion Ss of the rotating-side seal ring 1.

Since the multiple interference grooves 20 are provided circumferentially in the fourth embodiment, the pressure difference between the inlet portions 10a and the outlet portions 10b of the fluid circulation grooves 10 can be more frequently varied alternately than in the case of the third embodiment, and formation of deposits in the fluid circulation grooves 10 can be further prevented.

Although the embodiments of the present invention have been described above with reference to the drawings, a detailed configuration is not limited to the embodiments. Any change and addition made without departing from the scope of the present invention are also included in the present invention.

For example, although the embodiments have been described with an example in which a slide part is used for one of a pair of a rotating-side seal ring and a stationary-side seal ring in a mechanical seal device, it may be used as a bearing slide part that slides on a rotating shaft while sealing a lubricating oil in one of the axial directions of a cylindrical sealing face.

Further, for example, although the embodiments have been described with a case where a high-pressure sealed fluid is present on the outer-peripheral side, they may be applied to a case where a high-pressure fluid is on the inner-peripheral side.

Further, for example, although the embodiments have been described with a case where fluid circulation grooves are provided in a stationary-side seal ring of a mechanical seal constituting a slide component, and interference grooves are provided in a rotating-side seal ring, on the contrary, fluid circulation grooves may be provided in a rotating-side seal ring, and interference grooves in a stationary-side seal ring.

Further, for example, although the first and second embodiments have been described with a case where ends of interference grooves on the inside-diameter side are arranged radially in the vicinities of inlet portions and outlet portions of fluid circulation grooves, and the third and fourth embodiments with a case where ends of interference grooves on the inside-diameter side are arranged to radially overlap inlet portions and outlet portions of fluid circulation grooves, which are not limiting. These forms may be mixed.

REFERENCE SIGN LIST 1 rotating-side seal ring
2 rotating shaft
3 sleeve
4 cup gasket
5 stationary-side seal ring
6 housing
7 coiled wave spring
8 bellows
10 fluid circulation groove
10a inlet portion
10b outlet portion
10c connection portion
15 interference groove
15a end of the interference groove on the inside-diameter side
20 interference groove
20a end of the interference groove on the inside-diameter side
R land portion
S sealing face
Ss sealing portion

The invention claimed is:

1. A sliding component comprising a pair of sliding parts that slide relative to one another on a sealing face of each sliding part,
one of the sliding parts being provided, on its sealing face, with a plurality of fluid circulation grooves that are separated from each other wherein each of all of the fluid circulation grooves has, on the sealing face, an inlet portion and an outlet portion apart from each other in a circumferential direction, independently communicates with a high-pressure fluid side via the inlet portion and the outlet portion, and is separated from a low-pressure fluid side by a land portion of the sealing face of the one sliding part,
the other of the sliding parts being provided, on a sealing face margin, other than its sealing face, with a plurality of interference grooves that are provided circumferentially and separated from each other by a land portion of the sealing face margin of the other sliding part wherein each interference groove independently communicates only with the high-pressure fluid side, the plurality of interference grooves producing pressure variations in a fluid in the fluid circulation grooves, wherein the sealing face margin is provided on a same plane as that of the sealing face of the other sliding part and has an outside diameter made larger and an inside diameter made smaller than an outside diameter and an inside diameter of the one sliding part, respectively,
wherein the plurality of interference grooves of the other sliding part are arranged in a manner that when one of the interference grooves faces the inlet portion of one of the fluid circulation grooves of the one sliding part while the sliding parts are sliding relative to one another, no interference groove faces the outlet portion of the one of the fluid circulation grooves.

2. The sliding component according to claim 1, wherein the one sliding part is a stationary-side seal ring, the other sliding part is a rotating-side seal ring, the rotating-side seal ring is formed larger in outside diameter and smaller in inside diameter than the stationary-side seal ring, and the plurality of interference grooves is provided in a position to produce pressure variations in the fluid in the inlet portion and the outlet portion of the fluid circulation grooves.

3. The sliding component according to claim 1, wherein an end of the plurality of interference grooves on an inside-diameter side extends to a position radially in proximity to the inlet portion and the outlet portion of the fluid circulation grooves.

4. The sliding component according to claim 1, wherein an end of the plurality of interference grooves on an inside-diameter side extends to a position radially overlapping the inlet portion and the outlet portion of the fluid circulation grooves.

5. The sliding component according to claim 2, wherein an end of the plurality of interference grooves on an inside-diameter side extends to a position radially in proximity to the inlet portion and the outlet portion of the fluid circulation grooves.

6. The sliding component according to claim 2, wherein an end of the plurality of interference grooves on an inside-diameter side extends to a position radially overlapping the inlet portion and the outlet portion of the fluid circulation grooves.

* * * * *